Jan. 1, 1935.　　　　　E. ANDERSON　　　　1,986,551
STEEL RULE
Filed July 18, 1932
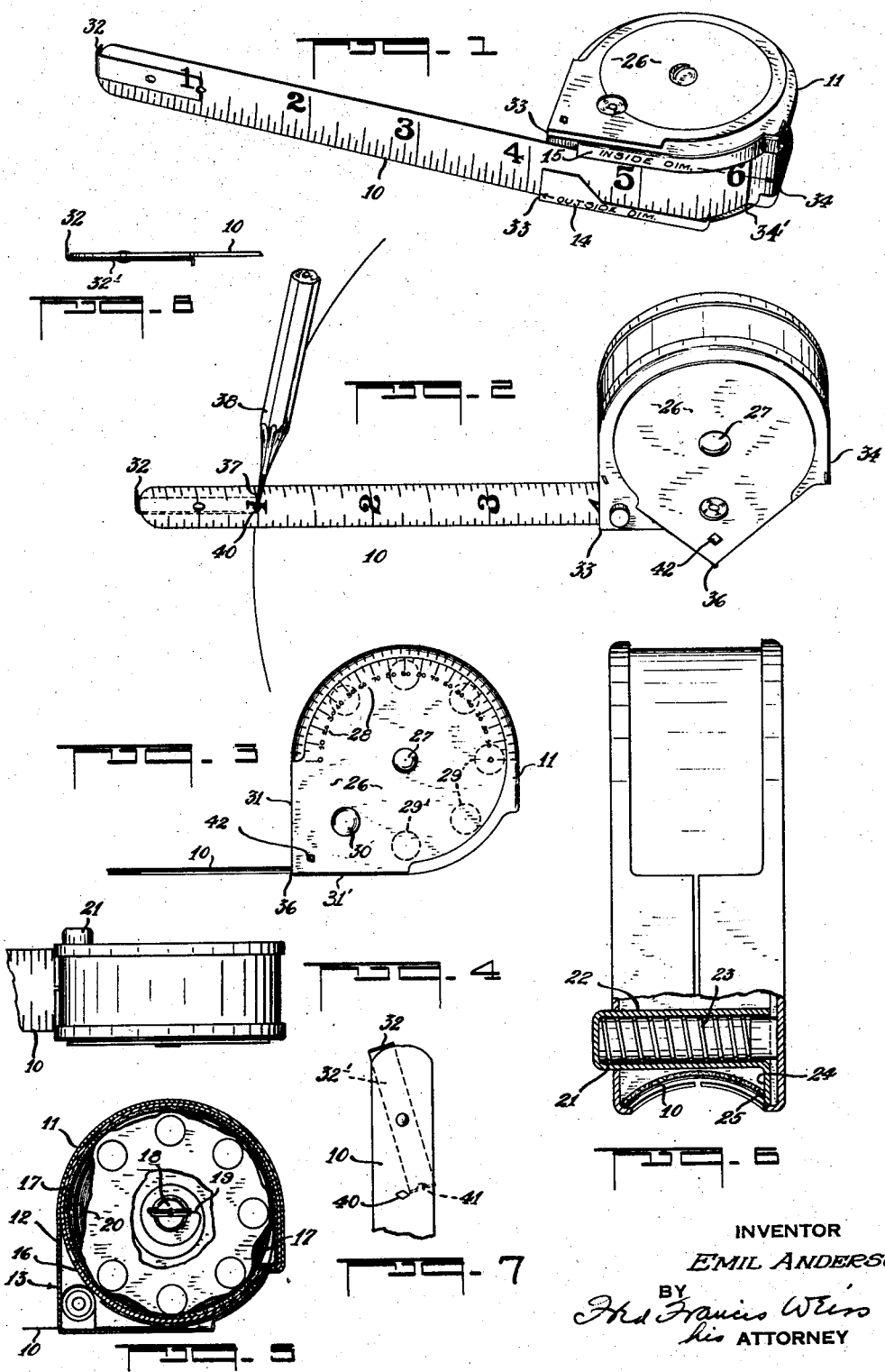
INVENTOR
EMIL ANDERSON
BY
his ATTORNEY Patented Jan. 1, 1935

1,986,551

UNITED STATES PATENT OFFICE 1,986,551

STEEL RULE

Emil Anderson, Briarcliffe, N. Y., assignor to Master Rule Manufacturing Company, Inc., New York, N. Y., a corporation of New York Application July 18, 1932, Serial No. 623,096

3 Claims. (Cl. 33—138)

This invention relates to a combination steel extension rule and casing of the convex-concave type.

The rule is designed, along with other purposes, to meet the general requirements of inside and outside direct reading measurements which can be taken in caliper style at unusual and awkward places, or even in the dark, by projecting the rule and moving the casing until it touches the object.

The rule is also useful as a marking gauge to lay out parallel lines or take readings at any desired angle.

The rule may be further used in place of a compass to describe a circle or an arc of a circle on a given radius.

It is a further purpose of this invention to provide an efficient and economical rule assembly whereby the convexity of the steel rule is flattened out as it is rolled on the outer part of the roll within a casing or a lined housing.

A still further object includes the provision of a casing for direct reading of inside and outside caliper measurements on a convex-concave rule. It also includes the provision of an index plate on said casing for taking extended measurements. I further provide guide shoes which form a base for the casing and along which base line the rule is unfolded and projected outwardly in a straight line. The rule part thus projected forms itself into its original convex-concave shape and assumes a rod-like position. This extension is along the surface to be measured and the convex surface is upward so as to obtain direct close readings on the object measured. By the expression "convex-concave rule" is meant a rule which is curved in cross-section and when unrestricted will assume a straight line form. In my case I have provided means for coiling the rule backwards, as it were, against the convex surface thereof so as to form a flat roll or coil within the casing. I have also provided a casing with an index plate by which it is possible to obtain different angular readings on the projected rule.

Other objects will appear hereinafter and I obtain these objects by a construction illustrated in the accompanying drawing, in which—

Figure 1 is a view in perspective showing the rule from the bottom or concave side;

Fig. 2 is a view in perspective showing the rule from the top or convex side with the index plate positioned to be used as a center on which to strike an arc or a circle;

Fig. 3 is a side elevation showing the index plate in normal position with the rule partially extended;

Fig. 4 is a top plan view thereof;

Fig. 5 is a side view of a portion of the casing with the index plate removed;

Fig. 6 is an end view showing the brake member for holding the rule in any fixed position;

Fig. 7 is a detail of the end of the rule shown in plan; and

Fig. 8 is an end view thereof.

Similar reference characters refer to the same parts throughout the several views.

In a preferred form of construction the combination rule comprises a rule member 10 which is movably contained in a casing 11. The rule member is of the convex-concave type, that is, the rule is curved in cross-section and, when unrestricted, will assume a straight or rod-like form, as is shown in Figs. 1 and 2 at 10. In Fig. 1 the rule is shown from the bottom side, that is from its concave side, while in Fig. 2 it is shown from the top or convex side. This arrangement provides for close straight-edge reading when the rule is applied to the object to be measured. The casing 11 comprises an outer shell 12 which is provided with an angular projection 13 having rule guiding shoes 14 and 15 (see Fig. 1) disposed in a substantially straight line with the projecting rule. This arrangement provides means for guiding the rule onto the surface to be measured. Rule 10 is coiled within the inner shell 16 of the casing 11. If desired, said shell 16 may be provided with a lining 17, as is best shown in Fig. 5. This lining provides a bearing surface against which the rule member is held. It also prevents the casing from being filled with foreign matter and dirt. The inner end of the rule is fastened to the casing by any convenient means, such as stud 18 in which the end 19 of the rule is gripped.

From this construction it will be clear that the convex-concave rule part is transformed into tape form and as such is wound flatwise in a close fitting coil 20 within the casing 11. In unwinding or extending the rule, the extending portion is taken from the outside of the coil and obviously, in winding up, the same member is wound up on the outside of the coil. In order to control the winding and unwinding of the rule I provide a brake member 21. This member comprises a cup-shaped portion 22 which is pressed in closing direction by a spring 23 so as to engage the brake shoe 24 with the rule member at 25.

The casing is further provided with an index plate 26. This plate is pivotally mounted at 27 on casing 11. The index plate may also be provided with degree markings 28 and with spaced seatings 29 and 29' in the casing plate beneath the index plate. As shown in Fig. 3 the degree markings cover the upper half of the index plate and number from 0 to 90 for each quadrant. The rim of the casing may also be marked in degrees, any one of which may be taken as 0. As a specific instance I have selected the mark opposite 0 on the left hand quadrant as the point where readings are taken for the index plate in different positions. For convenience spaced seatings are located at suitable distances which for my purpose is 45°. Button 30 on the index plate 26 registers normally with one of the spaced seatings to hold the plate in its initial position, that is in a position such that the edge 31 is in vertical position or at right angles to the rule 10. When in this position the base edge 31' of plate 26 is in line with the extension of the rule 10. For outside readings, the plate is stationed at this position.

In order to take outside readings or readings for outside measurements the rule is extended to a proper length such that hook 32 of member 32' on rule 10 will engage the edge of the object to be measured. The casing is then brought into position until it touches the object to be measured. Direct reading is then taken for outside dimensions, as shown in Fig. 1 at 33.

For inside reading the procedure just described is followed with the exception that the hook 32 of lever 32' is swung sideways so as to leave free the end of the rule to abut against the inside surface of the object to be measured, as the inside dimensions of a box, or the inside measurement of a window casing, or of the inside of a window sash, so as to obtain the size of a window pane for example. In order to obtain an inside measurement the rule is extended until the end thereof abuts against one side of the object to be measured and edge 34 of the casing abuts against the other. Direct readings for inside dimensions are then taken at 34', see Figure 1. The casing itself is formed as shown in Figure 1 to provide an index for the point of this reading. Thus the point where the tape first issues from the casing and becomes visible is the point where the reading is taken as indicated at 34'. The point of reading 34' does not coincide with the flat surface of contact 34 and its distance is such that the curved portion of the rule when flattened out would meet the plane located by the flat surface 34. Readings, therefore, for inside measurements are properly read at the index point 34'. It is understood that for projecting the rule to proper distances the brake shoe is released as explained above. In order to vary the angle of projection and take measurements at any angle to the normal of edge 31 (referring to Figure 3) the index plate is moved so that the button 30 engages with seat 29', that is, the index plate is moved relatively a number of degrees which in this instance is 45°. The rule member 10 is now extended at an angle of 45° from normal and measurements in that direction may be read directly. These readings are taken at the intersection of the rule by the projected plane of the side 31.

It is obvious that for other angles the index plate may be turned to proper positions as the case may require.

As it will be clearly noted from Figure 1, the rule of this invention is so constructed that in making measurements therewith, and particularly inside measurements the graduations on the tape and their numbers run consecutively from the free end up to the distant edge of the opening in the casing. Furthermore, the guides at the side of the opening are so constructed that substantially all of the graduations and all of the numbers are fully exposed and easily readable. These features are of considerable importance in any rule structure and are of particular importance in a rule adapted for taking inside measurements. The continuity of numbering for the full length of the tape in use as well as full exposure thereof, eliminates confusion and errors likely to arise in the use of such a structure.

By referring to Fig. 2 it is clear that the rule and casing may be used as a compass for describing circles, or arcs of circles with either the point 36 or the pencil point 37 taken as a center. The point 37 of pencil 38 is held in a slot 40 so as to serve to describe a circle or an arc. Obviously point 37 may be used as a center and point 36 may be used as the marking point. In order to place the pencil point definitely, any convenient means may be used. One such arrangement is shown in Fig. 7. In that instance I provide an angular slot opening 40 at a definite position in the rule. This position happens to be 1" from the end of the rule and corresponds with the distance between pivot point 36 (Fig. 2) and edge 33 for outside measurement readings. Outside measurement readings are, therefore, taken directly at 33.

In order to hold the pencil point in a definite position, as stated above, the swingable lever 32' is provided at its inner end with a seat or depression 41 which is located as to overlap opening 40 when turned at a definite position. In this manner the pencil or other point is firmly held in the rule for striking a circle or an arc.

From the above description it is apparent that the combination rule is of great utility for direct caliper readings for not only inside and outside measurements, but as a direct reading marking-gauge and also as means for reading and describing circles of large radii and for other purposes.

Having now described my invention, what I claim as new and useful, and desire to secure by Letters Patent is:

1. In a rule of the type described, the combination of a casing having two flat parallel abutment portions, a tape extending into said casing and being guided along a curved edge thereof between said abutment portions, said tape being exposed adjacent the one of said abutment portions which is farther from the tape end, an index on the casing at said farther abutment portion, the distance between said abutment portions being equal to the distance along said tape from the other of said abutment portions nearer the tape end to said index.

2. In a rule of the type described, the combination of a casing having a flat abutment portion, a tape extending out of said casing along a curved edge thereof from said abutment portion, said tape being exposed adjacent the said abutment portion, an index on the casing at said abutment portion, the perpendicular distance along the extended tape from the tape end to the abutment portion being equal to the distance along said tape from said tape end to said index.

3. In a rule of the type described, the combination of a casing shaped to form spaced abutment portions having an opening extending substantially from one abutment to the other, curved tape guides at the sides of the openings, a coiled tape in the casing and slidable from the casing in said guides along a curved path, said tape being exposed between the abutments and an index formed by the casing adjacent the abutment farthest from the end of the tape, the distance between the abutments being equal to the distance along the tape from the abutment nearest the end of the tape to the index.

EMIL ANDERSON.